United States Patent
McFarland et al.

(10) Patent No.: US 8,837,598 B2
(45) Date of Patent: Sep. 16, 2014

(54) SYSTEM AND METHOD FOR SECURELY TRANSMITTING VIDEO OVER A NETWORK

(75) Inventors: Rowan L. McFarland, Carrollton, TX (US); James Rodgers Tighe, Frisco, TX (US)

(73) Assignee: Cisco Technology, Inc., San Jose, CA (US)

( * ) Notice: Subject to any disclaimer, the term of this patent is extended or adjusted under 35 U.S.C. 154(b) by 1519 days.

(21) Appl. No.: 11/966,156

(22) Filed: Dec. 28, 2007

(65) Prior Publication Data

US 2009/0168892 A1 Jul. 2, 2009

(51) Int. Cl.
- H04N 7/12 (2006.01)
- H04N 19/61 (2014.01)
- H04N 21/4405 (2011.01)
- H04N 21/6334 (2011.01)
- H04N 7/167 (2011.01)
- H04N 21/2347 (2011.01)

(52) U.S. Cl.
CPC ....... H04N 7/1675 (2013.01); H04N 19/00781 (2013.01); H04N 21/44055 (2013.01); H04N 21/63345 (2013.01); H04N 21/23476 (2013.01)
USPC .......................... 375/240.24; 380/37; 380/210

(58) Field of Classification Search
None
See application file for complete search history.

(56) References Cited

U.S. PATENT DOCUMENTS

| | | | |
|---|---|---|---|
| 4,264,782 A | 4/1981 | Konheim | 178/22 |
| 5,533,051 A | 7/1996 | James | 375/240 |
| 5,541,995 A | 7/1996 | Normile et al. | |
| 5,734,892 A | 3/1998 | Chu | 395/612 |
| 5,805,700 A | 9/1998 | Nardone et al. | |
| 5,813,011 A | 9/1998 | Yoshida et al. | 707/101 |
| 5,832,490 A | 11/1998 | Riley | 707/101 |
| 5,963,909 A | 10/1999 | Warren et al. | 705/1 |
| 6,115,797 A | 9/2000 | Kanda et al. | 711/147 |
| 6,148,082 A | 11/2000 | Slattery et al. | 380/212 |
| 6,226,383 B1 | 5/2001 | Jablon | 380/30 |
| 6,532,121 B1 | 3/2003 | Rust et al. | 360/8 |
| 6,584,520 B1 | 6/2003 | Cowart et al. | 710/68 |
| 6,744,785 B2 | 6/2004 | Robinett et al. | 370/486 |
| 6,768,818 B2 | 7/2004 | Friederich et al. | 382/233 |
| 6,791,975 B1 | 9/2004 | Aktas et al. | |
| 6,831,969 B2 | 12/2004 | Ju | 379/142.16 |
| 6,885,749 B1 | 4/2005 | Chang et al. | |
| 6,920,154 B1 | 7/2005 | Achler | 370/477 |
| 6,959,088 B1 | 10/2005 | Yamaguchi | |
| 6,996,717 B2 | 2/2006 | Yin et al. | 713/176 |
| 7,020,284 B2 | 3/2006 | Boykin et al. | 380/200 |
| 7,062,048 B2 | 6/2006 | Livaditis et al. | 380/241 |

(Continued)

OTHER PUBLICATIONS

Patent Pending Application entitled *System and Method for Encryption and Secure Transmission of Compressed Media* by James Rodgers Tighe, et al.; 36 total pages, filed Dec. 28, 2007.

(Continued)

*Primary Examiner* — Andrew Lai
*Assistant Examiner* — Leon Andrews
(74) *Attorney, Agent, or Firm* — Baker Botts L.L.P.

(57) ABSTRACT

A method comprises receiving a bit stream associated with at least one video image, wherein the bit stream comprises at least one macroblock header and a plurality of macroblocks. The method continues by encrypting the at least one macroblock header. The method concludes by transmitting the bit stream such that the at least one macroblock header is in an encrypted format and at least one macroblock is in an unencrypted format.

18 Claims, 3 Drawing Sheets

(56) References Cited

U.S. PATENT DOCUMENTS

| | | | |
|---|---|---|---|
| 7,124,303 B2 | 10/2006 | Candelore et al. ............ 713/193 |
| 7,131,004 B1 | 10/2006 | Lyle ............................. 713/169 |
| 7,140,036 B2 | 11/2006 | Bhagavatula et al. ............ 726/2 |
| 7,143,095 B2 | 11/2006 | Barrett et al. ................... 707/10 |
| 7,151,832 B1 | 12/2006 | Fetkovich et al. ............ 380/210 |
| 7,283,904 B2 | 10/2007 | Benjamin et al. ............ 701/117 |
| 7,342,966 B2 | 3/2008 | Lepine et al. ............ 375/240.24 |
| 7,457,415 B2 | 11/2008 | Reitmeier et al. ............ 380/210 |
| 7,558,953 B2 | 7/2009 | Osthoff et al. ................ 713/161 |
| 7,562,213 B1 | 7/2009 | Timms |
| 2002/0003881 A1 | 1/2002 | Reitmeier et al. |
| 2002/0018565 A1 | 2/2002 | Luttrell et al. |
| 2002/0025045 A1 | 2/2002 | Raike ............................ 380/280 |
| 2002/0085734 A1 | 7/2002 | Keeney et al. ................ 382/100 |
| 2002/0118828 A1* | 8/2002 | Yoshimura et al. ............ 380/37 |
| 2003/0016630 A1 | 1/2003 | Vega-Garcia et al. ........ 370/252 |
| 2003/0185455 A1* | 10/2003 | Goertzen ...................... 382/240 |
| 2003/0217165 A1 | 11/2003 | Buch et al. .................... 709/229 |
| 2003/0231767 A1* | 12/2003 | Carbajal ........................ 380/200 |
| 2003/0231770 A1 | 12/2003 | Nishikawa |
| 2004/0081333 A1 | 4/2004 | Grab et al. |
| 2004/0091114 A1 | 5/2004 | Carter et al. .................. 380/259 |
| 2004/0189689 A1 | 9/2004 | Barrett .......................... 345/719 |
| 2004/0210762 A1 | 10/2004 | Kawamoto et al. ........... 713/193 |
| 2004/0237110 A1 | 11/2004 | Jones, Jr. ......................... 725/74 |
| 2004/0258243 A1 | 12/2004 | Shin et al. ..................... 380/210 |
| 2005/0005205 A1 | 1/2005 | Shiue et al. |
| 2005/0025048 A1 | 2/2005 | Masuda et al. ................ 370/229 |
| 2005/0050424 A1 | 3/2005 | Matsuura ...................... 714/748 |
| 2005/0120208 A1 | 6/2005 | Dobson |
| 2005/0169465 A1 | 8/2005 | Itani ................................ 380/42 |
| 2005/0180568 A1 | 8/2005 | Krause |
| 2005/0207569 A1* | 9/2005 | Zhang et al. .................... 380/28 |
| 2005/0213760 A1 | 9/2005 | LeComte et al. |
| 2005/0216669 A1 | 9/2005 | Zhu et al. ...................... 711/118 |
| 2005/0256722 A1 | 11/2005 | Clark ............................ 704/500 |
| 2005/0286778 A1 | 12/2005 | Atsumi .......................... 382/232 |
| 2006/0010151 A1 | 1/2006 | Star Sung ..................... 707/102 |
| 2006/0059213 A1 | 3/2006 | Evoy ............................. 708/135 |
| 2006/0064746 A1 | 3/2006 | Aaron et al. .................... 726/13 |
| 2006/0123248 A1 | 6/2006 | Porter et al. .................. 713/193 |
| 2006/0222178 A1* | 10/2006 | Kuwabara et al. ............ 380/201 |
| 2006/0230014 A1 | 10/2006 | Kedem et al. .................... 707/1 |
| 2006/0239636 A1 | 10/2006 | Sugiyama et al. .............. 386/44 |
| 2007/0109965 A1 | 5/2007 | Davis ......................... 370/230.1 |
| 2007/0192861 A1 | 8/2007 | Varghese et al. ................ 726/23 |
| 2007/0195953 A1 | 8/2007 | Lecomte et al. |
| 2007/0196023 A1 | 8/2007 | Hama et al. |
| 2007/0217607 A1 | 9/2007 | Thiagarajan |
| 2007/0291941 A1 | 12/2007 | Socek et al. |
| 2008/0016372 A1 | 1/2008 | Staddon et al. |
| 2008/0037723 A1 | 2/2008 | Milstein et al. |
| 2008/0046757 A1 | 2/2008 | Staddon et al. ............... 713/189 |
| 2008/0055638 A1 | 3/2008 | Okamoto et al. ............ 358/1.15 |
| 2008/0084975 A1 | 4/2008 | Schwartz ..................... 379/88.22 |
| 2008/0101338 A1 | 5/2008 | Reynolds et al. ............. 370/352 |
| 2008/0130883 A1 | 6/2008 | Agaian et al. .................. 380/54 |
| 2008/0144079 A1 | 6/2008 | Pandey et al. |
| 2008/0170627 A1* | 7/2008 | Yamada et al. ........... 375/240.24 |
| 2008/0207120 A1 | 8/2008 | Kurina et al. .................... 455/39 |
| 2008/0219575 A1 | 9/2008 | Wittenstein ................... 382/238 |
| 2008/0273803 A1 | 11/2008 | Gough et al. |
| 2009/0006844 A1 | 1/2009 | Wing et al. .................... 713/156 |
| 2009/0063856 A1 | 3/2009 | Dunn et al. .................... 713/160 |
| 2009/0067629 A1 | 3/2009 | Kraszewski ................... 380/251 |
| 2009/0077359 A1 | 3/2009 | Chakravarthula et al. ..... 712/229 |
| 2009/0169001 A1 | 7/2009 | Tighe et al. ................... 380/217 |
| 2009/0316895 A1* | 12/2009 | Platt et al. ..................... 380/210 |
| 2009/0327751 A1 | 12/2009 | Koifman et al. .............. 713/189 |
| 2010/0008350 A1 | 1/2010 | Yang et al. .................... 370/349 |
| 2010/0014664 A1 | 1/2010 | Shirai et al. ..................... 380/44 |
| 2010/0192234 A1 | 7/2010 | Sugimoto et al. ............... 726/30 |
| 2010/0235171 A1 | 9/2010 | Takagi et al. .................. 704/500 |
| 2013/0058481 A1 | 3/2013 | Jacob |

OTHER PUBLICATIONS

USPTO, Office Action for U.S. Appl. No. 11/848,650 in the name of Chris A. Dunn; 15 pages, Dec. 30, 2010.

USPTO, Office Action for U.S. Appl. No. 11/966,247 in the name of James Rodgers Tighe; 30 pages, Feb. 4, 2011.

USPTO; Office Action for U.S. Appl. No. 11/770,226 in the name of Daniel G. Wing; 13 pages, Apr. 4, 2011.

Peterson, "Session Initiation Protocol (SIP) Authenticated Identity Body (AIB) Format," Network Working Group, pp. 1-13, Sep. 2004.

Peterson et al., "Enhancements for Authenticated Identity Management in the Session Initiation Protocol (SIP)," Network Working Group, pp. 1-41, Aug. 2006.

USPTO Office Action for U.S. Appl. No. 11/848,650, filed Aug. 31, 2007, Dunn, et al., OA dated Sep. 13, 2010, 13 pages, Sep. 13, 2010.

USPTO, Office Action for U.S. Appl. No. 11/848,650 in the name of Chris A. Dunn; 22 pages, May 11, 2011.

Response to Office Action for U.S. Appl. No. 11/848,650 in the name of Chris A. Dunn; 12 pages, Aug. 11, 2011.

USPTO; Office Action for U.S. Appl. No. 11/966,247 in the name of James Rodgers Tighe; 28 pages, Jun. 29, 2012.

USPTO Office Action for U.S. Appl. No. 11/966,247 in the name of James Rodgers Tighe; 30 pages, Jul. 7, 2011.

USPTO Office Action for U.S. Appl. No. 11/848,650 in the name of Chris A. Dunn; 21 pages, Sep. 2, 2011.

USPTO Office Action for U.S. Appl. No. 11/848,650 in the name of Chris A. Dunn; 18 pages, Dec. 22, 2011.

USPTO Office Action for U.S. Appl. No. 11/966,247 in the name of James Rodgers Tighe; 27 pages, Feb. 3, 2012.

USPTO Notice of Allowance and Fee(s) Due for U.S. Appl. No. 11/770,226 in the name of Daniel G. Wing; 7 pages, Feb. 10, 2012.

USPTO Office Action for U.S. Appl. No. 11/848,650 in the name of Chris A. Dunn; 20 pages, Apr. 13, 2012.

USPTO Office Action for U.S. Appl. No. 11/966,247 in the name of James Rodgers Tighe; mailed Nov. 6, 2013.

Tighe et al., U.S. Appl. No. 11/966,247, Response to Office Action, filed Jan. 28, 2014.

Dunn et al., U.S. Appl. No. 11/848,650, Office Action dated Aug. 20, 2012, Aug. 20, 2012.

Dunn et al., U.S. Appl. No. 11/848,650, Response to Office Action mailed Nov. 14, 2012.

Dunn et al., U.S. Appl. No. 11/848,650, Notice of Allowance dated Dec. 10, 2012.

Tighe et al., U.S. Appl. No. 11/966,247, Request for Continued Examination and Response, Oct. 1, 2012.

Tighe et al., U.S. Appl. No. 11/966,247, Response to Office Action; Request for Continued Examination and Amendment.

* cited by examiner

SYSTEM AND METHOD FOR SECURELY TRANSMITTING VIDEO OVER A NETWORK

TECHNICAL FIELD

This present disclosure relates generally to electronic video systems and more particularly to a system and method for securely transmitting video over a network.

BACKGROUND

Digital video generally comprises large amounts of data. Traditional techniques for securely transmitting digital video over a network often requires more time and/or processing resources than are available in typical video systems.

DESCRIPTION OF EXAMPLE EMBODIMENTS

Overview

In one embodiment, a method comprises receiving a bit stream associated with at least one video image, wherein the bit stream comprises at least one macroblock header and a plurality of macroblocks. The method continues by encrypting the at least one macroblock header. The method concludes by transmitting the bit stream such that the at least one macroblock header is in an encrypted format and at least one macroblock is in an unencrypted format.

Various embodiments described herein may have none, some, or all of the following advantages. One advantage is that a video system may efficiently provide video encryption. In particular, the video system is operable to encode a video as one or more bit streams. Each bit stream may comprise a macroblock header and a plurality of macroblocks. The macroblock header may comprise an index for mapping each macroblock in the bit stream to a respective portion of a video image. In some embodiments, the video system may encrypt the macroblock header without encrypting the entire bit stream. Encrypting the macroblock header while allowing the macroblocks to remain unencrypted may be faster and use less processing power than encrypting the entire bit stream.

Another advantage is that the encrypted bit stream may be securely transmitted over a network. In conjunction with encrypting the macroblock header, the video system may rearrange the sequence of macroblocks in the bit stream without encrypting the data within each macroblock. Because the macroblock header comprises an index for mapping the macroblocks into a particular image, a node that intercepts the bit stream cannot generate the particular image as long as the macroblock header remains encrypted. Thus, the video may be encrypted efficiently and transmitted securely. Other advantages may be apparent to one skilled in the art from the description and the appended claims.

Description

Figure 1:
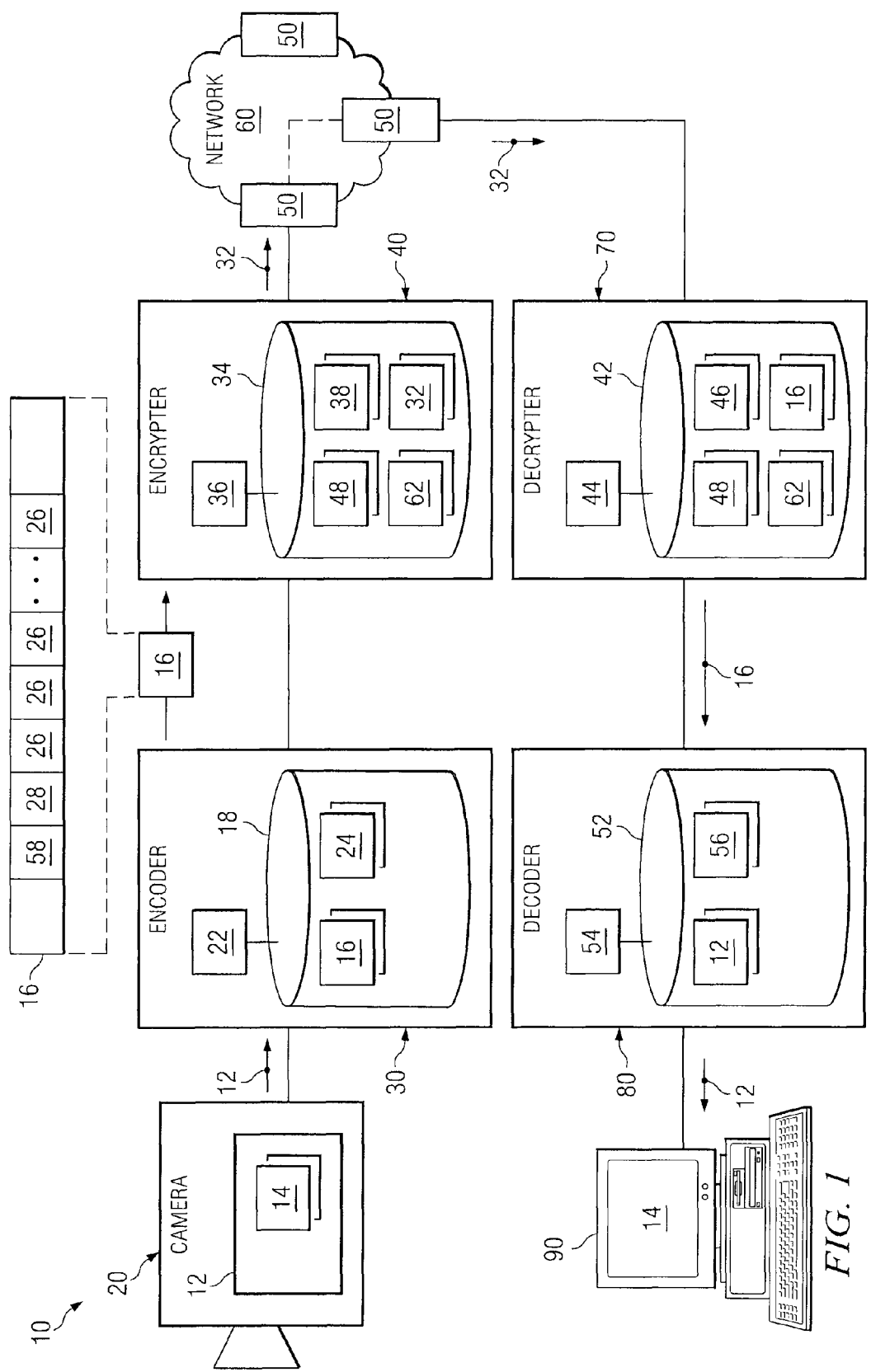
FIG. 1 illustrates a video system, according to certain embodiments.

FIG. 1 illustrates a video system 10, according to certain embodiments. Video system 10 is generally operable to capture, encode, encrypt, and transmit video 12 over one or more networks 60. Video system 10 may comprise a camera 20, an encoder 30, an encrypter 40, one or more routers 50, one or more networks 60, a decrypter 70, a decoder 80, and one or more display devices 90.

Camera 20 represents any suitable device that records and/or captures video 12. Video 12 is a sequence of images 14 that represent a scene in motion. Each image 14 in the video sequence may be referred to as a frame. Camera 20 may be a camcorder, webcam, digital camera, television camera, cellphone, and/or any suitable device for recording and/or capturing video 12. According to certain embodiments, camera 20 may be part of a video/audio conferencing system. Camera 20 may output video 12 in any suitable format. In some embodiments, camera 20 records video 12 onto a disk, magnetic tape, and/or suitable storage medium. In other embodiments, camera 20 outputs video 12 as an analog and/or digital signal.

System 10 may comprise an encoder 30 that receives and encodes video 12 from camera 20. Encoding may refer to the conversion and/or compression of video 12 into bit streams 16 that conform to a particular digital format. In some embodiments, encoding comprises the "thinning" of chrominance data, lossy compression, lossless compression, and/or the quantization of images 14 from video 12. Encoder 30 is operable to encode video 12 according to any suitable format such as, for example, the H.261, H.263, H.264, MPEG-1, MPEG-2, and/or MPEG-4 formats. In some embodiments, encoding may comprise re-encoding video 12 from a particular digital format into another digital format. In other embodiments, encoding may comprise converting video 12 from an analog format to a digital format.

Encoder 30 may comprise any suitable hardware and/or software to provide the described functions and/or operations. In some embodiments, encoder 30 may represent a general-purpose personal computer (PC), a laptop, a Macintosh, a workstation, a Unix-based computer, a server computer, or any suitable processing device. In certain embodiments, encoder 30 is part of camera 20.

Encoder 30 may comprise encoder memory 18 and encoder processor 22. Encoder memory 18 may comprise any suitable arrangement of random access memory (RAM), read only memory (ROM), magnetic computer disk, CD-ROM, or other magnetic or optical storage media, or any other volatile or non-volatile memory devices that store one or more files, lists, tables, or other arrangements of information. In some embodiments, encoder memory 18 may store bit streams 16 and encoder logic 24. Encoder logic 24 generally comprises rules, algorithms, code, tables, and/or other suitable instructions for encoding video 12 from camera 20.

Encoder memory 18 may be communicatively coupled to encoder processor 22. Encoder processor 22 is generally operable to execute encoder logic 24 to encode and/or convert video 12 from camera 20 into bit streams 16. Encoder processor 22 may comprise any suitable combination of hardware and software implemented in one or more modules to provide the described functions and/or operations.

As explained above, encoder 30 may output bit streams 16. In some embodiments, each bit stream 16 corresponds to at least a portion of a given image 14 in video 12. Encoder 30 may package a particular bit stream 16 as a Real-Time Protocol (RTP) packet. Bit stream 16 for a particular image 14 may comprise one or more headers and a plurality of macroblocks 26. Each macroblock 26 corresponds to a respective portion of the pixels of the particular image 14. For example, a particular macroblock 26 may be a block of 8×8 pixels, 16×16 pixels, and/or any suitable number of pixels from image 14. A particular macroblock 26 of multiple pixels may comprise data regarding the luminance and/or chrominance of the corresponding pixels in image 14.

In some embodiments, at least one header in each bit stream 16 is a macroblock header 28. Macroblock header 28 generally comprises an index that maps each macroblock 26 in bit stream 16 to a respective location in image 14 associated with bit stream 16. System 10 may use macroblock header 28 to decode bit stream 16 and to map particular macroblocks 26 to particular pixels of a display. Thus, system 10 may use macroblock header 28 to reconstitute the particular image 14 from bit stream 16. In some embodiments, macroblock header 28 may be a "groups of blocks" (GOB) header. In other embodiments, macroblock header 28 may be any suitable header that comprises an index for mapping macroblocks 26 in bit stream 16 to respective pixels of image 14 from video 12.

In some embodiments, macroblock header 28 may further comprise movement data. Movement data in macroblock header 28 may describe the movement of an object in a series of video frames. In some portions of video 12, the appearance of a particular object may not change from one frame to the next. However, the particular object may move relative to other objects. For example, a portion of video 12 may depict a car that is moving across a landscape. The appearance of the car may not change from one frame to the next, but the position of the car relative to other objects in the landscape may change. Rather than re-transmit the pixel, color, and other image data for the car with each successive frame, bit stream 16 may instead communicate movement data that instructs a processor regarding how and where to move the car in successive frames. In some embodiments, by configuring macroblock header 28 with movement data, encoder 30 may conserve processing and memory resources. Thus, macroblock header 28 may comprise (1) movement data and/or (2) index data that maps each macroblock 26 in bit stream 16 to a respective location in image 14 associated with bit stream 16.

Encoder 30 may transmit bit stream 16 to encrypter 40. Encrypter 40 is generally operable to encrypt at least a portion of bit stream 16. In particular, encrypter 40 may encrypt macroblock header 28 in the respective bit stream 16 associated with each image 14 of video 12. In some embodiments, encrypter 40 may rearrange the sequence of macroblocks 26 in bit stream 16. Once macroblock header 28 has been encrypted, bit stream 16 may be referred to as encrypted bit stream 32. Encrypter 40 may output at least one encrypted bit stream 32 for each image 14 of video 12.

Encrypter 40 may comprise any suitable hardware and/or software to provide the described functions and/or operations. In some embodiments, encrypter 40 may represent a general-purpose personal computer (PC), a laptop, a Macintosh, a workstation, a Unix-based computer, a server computer, or any suitable processing device. In certain embodiments, encrypter 40 is part of router 50. In other embodiments, encrypter 40 is part of encoder 30. According to certain embodiments, both encrypter 40 and encoder 30 are part of camera 20.

Encrypter 40 may comprise encrypter memory 34 and encrypter processor 36. Encrypter memory 34 may comprise any suitable arrangement of random access memory (RAM), read only memory (ROM), magnetic computer disk, CD-ROM, or other magnetic or optical storage media, or any other volatile or non-volatile memory devices that store one or more files, lists, tables, or other arrangements of information. In some embodiments, encrypter memory 34 may store encrypted bit stream 32 and encrypter logic 38. Encrypter logic 38 generally comprises rules, algorithms, code, tables, and/or other suitable instructions for encrypting one or more bit streams 16.

Encrypter memory 34 may be communicatively coupled to encrypter processor 36. Encrypter processor 36 is generally operable to execute encrypter logic 38 to encrypt at least a portion of bit stream 16. Encrypter processor 36 may comprise any suitable combination of hardware and software implemented in one or more modules to provide the described functions and/or operations.

In some embodiments, encrypter 40 may be communicatively coupled to router 50. Router 50 refers to a network device that is operable to route and/or forward data in one or more networks 60. For example, router 50 may be a switch (e.g., layer three switch, network switch, and/or any suitable component) that routes IP packets in an IP network 60. In some embodiments, router 50 may interconnect logical subnets of one or more networks 60. Router 50 may determine the destination address of a data packet, determine an appropriate network path for the data packet, and/or forward the data packet along the determined network path. In some embodiments, router 50 may comprise a control plane, a forwarding plane, and/or one or more routing tables. A routing table may comprise a list of destination addresses and/or interfaces associated therewith. Router 50 may represent a provider edge router, subscriber edge router, inter-provider router, core router, residential gateway, enterprise router, and/or any suitable network device for routing data in network 60. Router 50 may comprise a processor, memory, and/or any suitable hardware and/or software for performing the described functions and operations.

Router 50 may be communicatively coupled to one or more networks 60. Network 60 may represent any number and combination of wireline and/or wireless networks suitable for data transmission. Network 60 may, for example, communicate internet protocol packets, frame relay frames, asynchronous transfer mode cells, and/or other suitable information between network addresses. Network 60 may include one or more intranets, local area networks, metropolitan area networks, wide area networks, cellular networks, all or a portion of the Internet, and/or any other communication system or systems at one or more locations. Network 60 may comprise any suitable number and combination of routers 50.

One or more routers 50 associated with network 60 may be communicatively coupled to decrypter 70. Decrypter 70 is generally operable to decrypt at least a portion of encrypted bit stream 32. In particular, decrypter 70 may decrypt macroblock headers 28. In some embodiments, decrypter 70 may unscramble the sequence of macroblocks 26 in encrypted bit stream 32. Decrypter 70 may output and transmit bit stream 16 to decoder 80.

Decrypter 70 may comprise any suitable hardware and/or software to provide the described functions and/or operations. In some embodiments, decrypter 70 may represent a general-purpose personal computer (PC), a laptop, a Macintosh, a workstation, a Unix-based computer, a server computer, or any suitable processing device. In certain embodiments, decrypter 70 is part of router 50. In other embodiments, decrypter 70 is part of decoder 80. According to certain embodiments, both decrypter 70 and decoder 80 are part of display device 90.

Decrypter 70 may comprise decrypter memory 42 and decrypter processor 44. Decrypter memory 42 may comprise any suitable arrangement of random access memory (RAM), read only memory (ROM), magnetic computer disk, CD-ROM, or other magnetic or optical storage media, or any other volatile or non-volatile memory devices that store one or more files, lists, tables, or other arrangements of information. In some embodiments, decrypter memory 42 may store bit stream 16 and decrypter logic 46. Decrypter logic 46 generally comprises rules, algorithms, code, tables, and/or other suitable instructions for decrypting one or more encrypted bit streams 32.

Decrypter memory 42 may be communicatively coupled to decrypter processor 44. Decrypter processor 44 is generally operable to execute decrypter logic 46 to decrypt at least a portion of encrypted bit stream 32. Decrypter processor 44 may comprise any suitable combination of hardware and software implemented in one or more modules to provide the described functions and/or operations.

In some embodiments, decrypter memory 42 and/or encrypter memory 34 may store one or more cryptographic keys 48. Cryptographic key 48 may represent parameters, numbers, and/or other information that may be input into a cryptographic algorithm. In some embodiments, cryptographic key 48 may control data transformation associated with the encryption and/or decryption of data. Cryptographic key 48 may be configured for a symmetric key algorithm, asymmetric key algorithm, digital signature scheme, and/or any suitable cryptographic technique. In some embodiments, cryptographic key 48 may be randomly generated. In other embodiments, cryptographic key 48 may be based at least in part on a password from a user. A password from a user may represent a shared secret that is exchanged between encrypter 40 and decrypter 70 prior to the transmission of one or more encrypted bit streams 32 over network 60. To encrypt/decrypt bit stream 16, encrypter 40 and/or decrypter 70 may execute an algorithm that conforms to the Digital Encryption Standard (DES), Advanced Encryption Standard (AES), Triple Data Encryption Standard (Triple DES), and/or any suitable type and/or combination of cryptographic algorithms.

Decrypter 70 may transmit bit stream 16 to decoder 80, which is generally operable to decode bit stream 16. For a particular image 14, decoding may comprise decompressing bit stream 16 into at least a portion of image 14 of video 12. Decoder 80 may decompress bit stream 16 based at least in part on entropy decompression, pixel prediction, inloop deblocking, frequency transform, and/or any number and combination of suitable video decoding techniques. In some embodiments, decoding comprises mapping particular macroblocks 26 from bit stream 16 to particular portions of image 14 based at least in part on macroblock header 28. As explained above, macroblock header 28 may comprise an index that maps each macroblock 26 to a respective portion of image 14 in video 12. In some embodiments, decoding comprises converting a digital video signal to an analog format. In other embodiments, decoding comprises converting a video signal from a particular digital format to another digital format.

Decoder 80 may comprise any suitable hardware and/or software to provide the described functions and/or operations. In some embodiments, decoder 80 may represent a general-purpose personal computer (PC), a laptop, a Macintosh, a workstation, a Unix-based computer, a server computer, or any suitable processing device.

Decoder 80 may comprise decoder memory 52 and decoder processor 54. Decoder memory 52 may comprise any suitable arrangement of random access memory (RAM), read only memory (ROM), magnetic computer disk, CD-ROM, or other magnetic or optical storage media, or any other volatile or non-volatile memory devices that store one or more files, lists, tables, or other arrangements of information. In some embodiments, decoder memory 52 may store video 12 and decoder logic 56. Decoder logic 56 generally comprises rules, algorithms, code, tables, and/or other suitable instructions for decoding one or more bit streams 16.

Decoder memory 52 may be communicatively coupled to decoder processor 54. Decoder processor 54 is generally operable to execute decoder logic 56 to decode bit stream 16 to a video signal that may be input to display device 90. Decoder processor 54 may comprise any suitable combination of hardware and software implemented in one or more modules to provide the described functions and/or operations.

Display device 90 is generally operable to receive and display video 12 from decoder 80. Display device 90 may comprise any suitable device for providing a visual presentation of video 12. Display device 90 may comprise a television, computer monitor, CRT device, plasma display, projector, LCD display, computer, workstation, electronic notebook, phone, Personal Digital Assistant (PDA), and/or any suitable device (wireless, wireline, or otherwise). According to certain embodiments, display device 90 may be part of a video/audio conferencing system. In some embodiments, decoder 80 may be part of display device 90.

It should be understood that the internal structure of video system 10 and the servers, processors, and memory devices associated therewith is malleable and can be readily changed, modified, rearranged, or reconfigured to achieve the intended operations of video system 10. It should be further understood that particular components of video system 10 may be combined or separated in any suitable manner according to the desired configuration of video system 10.

In operation, camera 20 records and/or captures video 12 that comprises a sequence of images 14. Encoder 30 then encodes video 12 into a suitable digital format such as, for example, the H.261, H.263, H.264, MPEG-1, MPEG-2, and/or MPEG-4 format. For a particular image 14, encoder 30 may output at least one bit stream 16 that comprises macroblock header 28 and a plurality of macroblocks 26. Encrypter 40 may then encrypt at least a portion of bit stream 16. In particular, encrypter 40 may encrypt macroblock header 28 and may rearrange the sequence of macroblocks 26 in bit stream 16. Other headers and/or portions of bit stream 16 may remain unencrypted. Encrypter 40 may then transmit encrypted bit stream 32 to router 50.

Router 50 may forward encrypted bit stream 32 over network 60 to the appropriate router 50 associated with decrypter 70. In some embodiments, because portions of encrypted stream were not encrypted, router 50 may read and/or determine the appropriate destination address of encrypted bit stream 32 without having to decrypt all or portions of encrypted bit stream 32.

Decrypter 70 may receive and decrypt encrypted bit stream 32 from network 60. In particular, decrypter 70 may decipher and/or convert macroblock header 28 to its original format. Decrypter 70 may further unscramble the sequence of macroblocks 26 in encrypted bit stream 32. Decrypter 70 may transmit bit stream 16 to decoder 80, which may decompress bit stream 16 into at least a portion of image 14 in video 12. Using the decrypted macroblock header 28 in bit stream 16, decoder 80 may map macroblocks 26 from bit stream 16 to their respective locations in image 14 associated with bit stream 16. Decoder 80 may output and transmit video 12 to display device 90, which may display video 12 to a user.

In some embodiments, video system 10 may provide various advantages. Various embodiments of video system 10 may have none, some, or all of these advantages. One advantage is that video system 10 may encrypt and securely transmit video 12 over network 60. In particular, for a particular bit stream 16, video system 10 may encrypt macroblock header 28 without encrypting the entire bit stream 16. For example, the data in each macroblock 26 may remain unencrypted. Because the data within each macroblock 26 remains unencrypted, encrypting and decrypting bit stream 16 in video system 10 may be faster and require less processing resources than encrypting and decrypting an entire bit stream 16. Because macroblock header 28 comprises an index for mapping macroblocks 26 to image 14, decoder 80 cannot generate image 14 from bit stream 16 as long as macroblock header 28 remains encrypted. Thus, video 12 may be encrypted efficiently and kept secure from unauthorized users.

Figure 2:
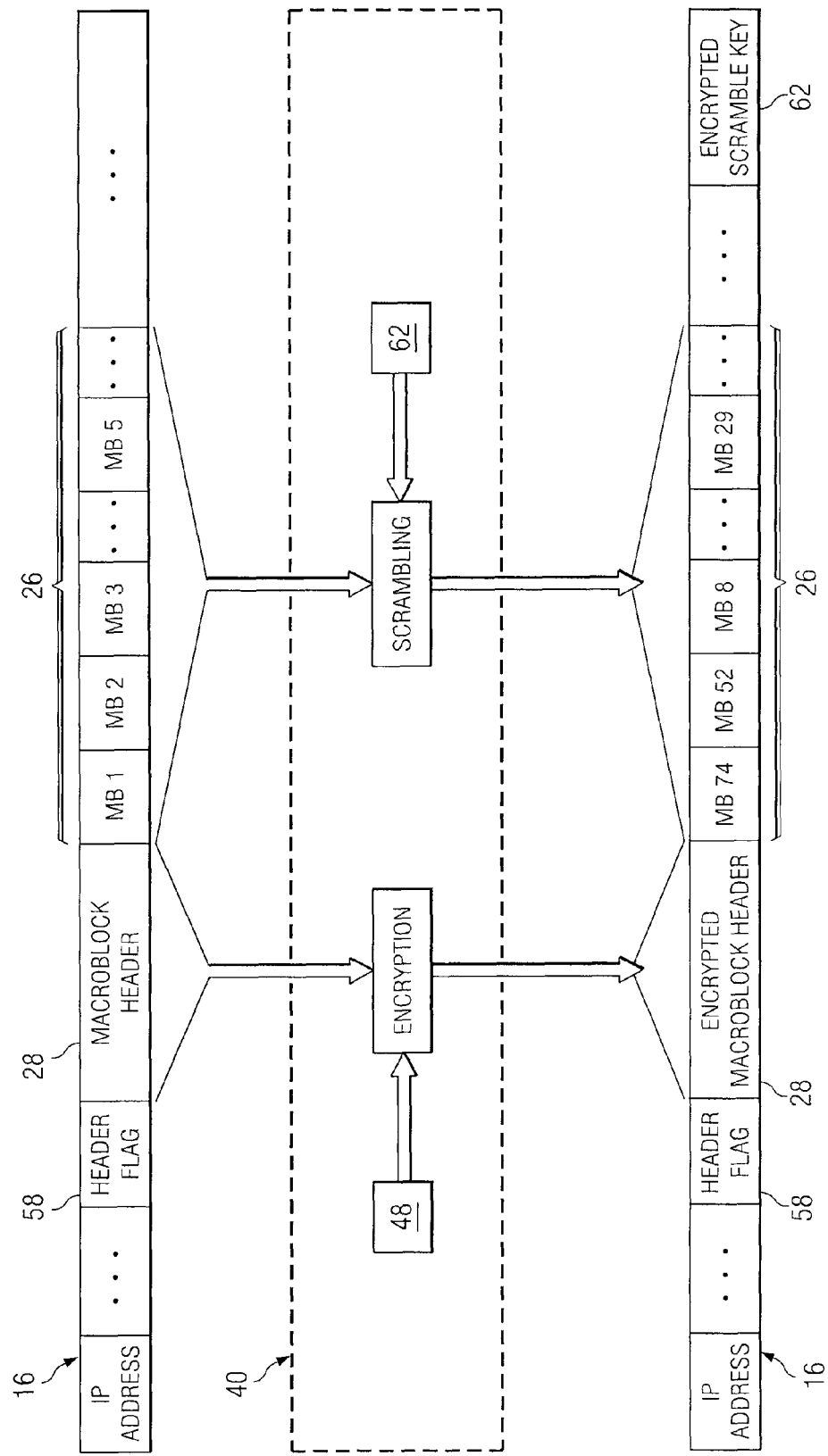
FIG. 2 illustrates the encryption of a bit stream, according to certain embodiments.

FIG. 2 illustrates the encryption of bit stream 16, according to certain embodiments. As explained above, encoder 30 may output bit stream 16 that comprises macroblock header 28 and a plurality of macroblocks 26. Each macroblock 26 corresponds to a respective portion of the pixels of a particular image 14. In some embodiments, each macroblock 26 is associated with a respective identifier. For example, bit stream 16 may comprise a first macroblock 26 identified as "MB1", a second macroblock 26 identified as "MB2", and so forth. The plurality of macroblocks 26 in bit stream 16 may be arranged in a particular sequence. In some embodiments, macroblock header 28 signifies the start of the plurality of macroblocks 26 in bit stream 16. As explained above, macroblock header 28 may comprise an index that maps each macroblock 26 to a respective portion of image 14 in video 12.

Encoder 30 may transmit bit stream 16 to encrypter 40, which may store a cryptographic key 48. Cryptographic key 48 may be a shared secret that is exchanged between encrypter 40 and decrypter 70 prior to the transmission of one or more bit streams 16 over network 60. In some embodiments, a particular cryptographic key 48 may be hard coded in encrypter 40 and/or decrypter 70. In other embodiments, cryptographic key 48 may be derived from a password input by a user and/or received from any suitable key source. Encoder 30 may input cryptographic key 48 into an encryption algorithm stored in encrypter memory 34 in order to encrypt macroblock header 28 in bit stream 16. The encryption algorithm may be a symmetric key algorithm, asymmetric key algorithm, DES algorithm, AES algorithm, Triple DES algorithm, and/or any suitable algorithm for encrypting macroblock header 28.

In some embodiments, bit stream 16 may comprise a header flag 58 in association with macroblock header 28. Header flag 58 may be one or more bits that signify the start of macroblock header 28 in bit stream 16. In some embodiments, header flag 58 signifies whether macroblock header 28 is in an encrypted state. According to certain embodiments, encrypter 40 does not encrypt header flag 58. Upon receiving encrypted bit stream 32 from network 60, decrypter 70 may scan encrypted bit stream 32 for header flag 58 in order to locate the encrypted macroblock header 28.

In some embodiments, encrypter memory 34 stores a scramble key 62. Encrypter 40 may use scramble key 62 to rearrange macroblocks 26 in bit stream 16 into a scrambled sequence. Rearranging macroblocks 26 in bit stream 16 may comprise changing the sequence of macroblocks 26 without actually encrypting the bits of data (e.g., chrominance data, luminance data, etc.) in each macroblock 26. Scramble key 62 may represent a series of numbers, a code, a series of macroblock identifiers, and/or other suitable information from which the original sequence of macroblocks 26 can be determined. Encrypter 40 may input scramble key 62 into a transform function to determine a scrambled sequence in which to rearrange macroblocks 26. According to certain embodiments, encrypter 40 rearranges macroblocks 26 into a random or pseudo-random sequence. In some embodiments, after using scramble key 62 to rearrange the sequence of macroblocks 26, encrypter 40 encrypts scramble key 62 and transmits the encrypted scramble key 62 with encrypted bit stream 32. In other embodiments, encrypter 40 transmits the encrypted scramble key 62 separately from encrypted bit stream 32. According to certain embodiments, scramble key 62 is associated with and/or derived from a password that is exchanged between encrypter 40 and decrypter 70 in conjunction with the transmission of data over network 60.

In some embodiments, although encrypter 40 encrypts macroblock header 28, encrypter 40 does not encrypt data in the other portions of bit stream 16. For example, encrypter 40 may not encrypt the sequence header, destination address, buffer parameters, and/or other portions of bit stream 16. According to certain embodiments, although encrypter 40 rearranges the sequence of macroblocks 26, encrypter 40 does not encrypt the data in each macroblock 26. By allowing portions of bit stream 16 to remain unencrypted, encrypter 40 may effectively secure bit stream 16 while expending less time and processing resources than if the entire bit stream 16 were encrypted.

Once macroblock header 28 is encrypted and the sequence of macroblocks 26 is rearranged, encrypter 40 may transmit encrypted bit stream 32 to router 50. Because portions of encrypted bit stream 32 are not encrypted (e.g., destination address, RTP header, etc.), router 50 may determine that encrypted bit stream 32 comprises video data. Router 50 may further determine the appropriate path along which to forward encrypted bit stream 32.

Once encrypted bit stream 32 traverses network 60, decrypter 70 may receive and decrypt encrypted bit stream 32. In some embodiments, decrypter 70 may use cryptographic key 48 to decipher macroblock header 28. Deciphering macroblock header 28 may comprise restoring macroblock header 28 to its original form. In conjunction with decrypting macroblock header 28, decrypter 70 may use cryptographic key 48 to decipher the encrypted scramble key 62. Decrypter 70 may then input scramble key 62 into a transform function to determine the original sequence of macroblocks 26 in bit stream 16. Decrypter 70 may rearrange macroblocks 26 back to their original sequence. Decrypter 70 may output bit stream 16 to decoder 80, which may decompress bit stream 16 into video 12, which may be displayed on display device 90.

Although the foregoing example describes bit stream 16 that comprises macroblock header 28 and a plurality of macroblocks 26, it should be understood that bit stream 16 associated with video 12 may comprise a plurality of layers. For example, bit stream 16 may comprise a picture layer, a macroblock header layer (e.g., groups of blocks ("GOB") layer), a macroblock layer, and a block layer. In some embodiments, the encryption/decryption described above occurs at the macroblock header layer.

In the foregoing example, encrypter 40 encrypts macroblock header 28 in conjunction with scrambling the sequence of macroblocks 26. In some embodiments, encrypter 40 may effectively encrypt bit sequence without scrambling the sequence of macroblocks 26. In particular, encrypter 40 may encrypt macroblock header 28 in bit stream 16 but leave the plurality of macroblocks 26 in their original sequence.

Figure 3:
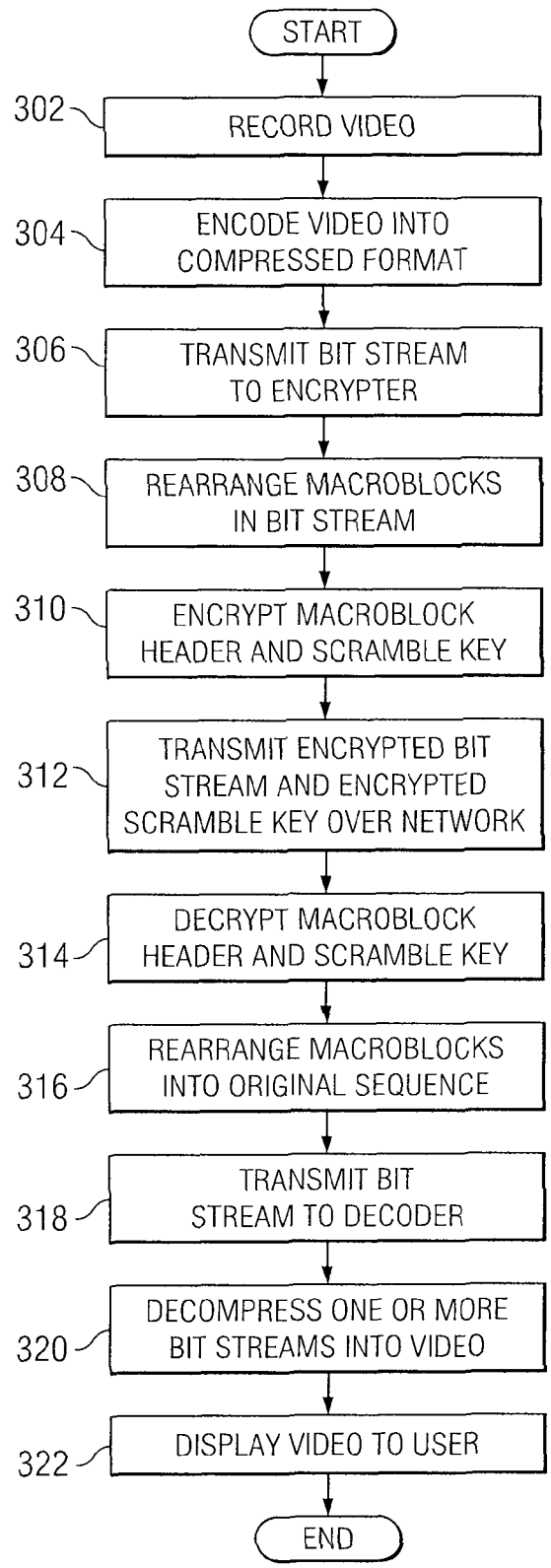
FIG. 3 illustrates a flowchart for encrypting and transmitting video over a network, according to certain embodiments.

FIG. 3 illustrates a flowchart for encrypting and transmitting video 12 over network 60, according to certain embodiments. The method begins at step 302 where camera 20 records video 12 comprising a plurality of images 14. At step 304, encoder 30 receives and encodes video 12 into a compressed format. Encoding video 12 may comprise generating at least one bit stream 16 for each image 14 of video 12. Bit stream 16 may comprise macroblock header 28 and a plurality of macroblocks 26. In some embodiments, macroblock header 28 may comprise an allocation map that correlates each macroblock 26 to a particular slice of image 14.

At step 306, encoder 30 transmits bit stream 16 to encrypter 40. At step 308, encrypter 40 rearranges macroblocks 26 in bit stream 16 into a scrambled sequence. Encrypter 40 may determine the scrambled sequence by inputting scramble key 62 into a transform function. At step 310, encrypter 40 encrypts macroblock header 28 in bit stream 16 as well as scramble key 62. At step 312, encrypter 40 transmits encrypted bit stream 32 and the encrypted scramble key 62 over network 60 to decrypter 70.

At step 314, decrypter 70 decrypts macroblock header 28 and scramble key 62. Encoder 30 and decoder 80 may perform the encryption/decryption using any suitable cryptographic algorithm and/or cryptographic key 48. At step 316, decrypter 70 inputs the decrypted scramble key 62 into a transform function to determine the original sequence of macroblocks 26 in bit stream 16. Decrypter 70 may rearrange macroblocks 26 into their original sequence. At step 318, decrypter 70 transmits bit stream 16 to decoder 80. At step 320, decoder 80 decompresses one or more bit streams 16 into video 12. Decoder 80 may decompress bit stream 16 based at least in part on entropy decompression, pixel prediction, inloop deblocking, frequency transform, and/or any number and combination of suitable video decoding techniques. At step 322, display device 90 displays video 12 to a user. The method then ends.

The present disclosure encompasses all changes, substitutions, variations, alterations, and modifications to the example embodiments described herein that a person having ordinary skill in the art would comprehend. Similarly, where appropriate, the appended claims encompass all changes, substitutions, variations, alterations, and modifications to the example embodiments described herein that a person having ordinary skill in the art would comprehend.

What is claimed is:

1. A method, comprising:
receiving a bit stream associated with at least one video image, wherein the bit stream comprises at least one macroblock header and a plurality of macroblocks, the plurality of macroblocks arranged in a first sequence;
encrypting, using a processor, the at least one macroblock header;
rearranging, using the processor, the plurality of macroblocks into a second sequence in the bit stream, in conjunction with encrypting the at least one macroblock header; and
transmitting, using the processor, the bit stream such that:
the at least one macroblock header is in an encrypted format; and
at least one macroblock is in an unencrypted format.

2. The method of claim 1, wherein the bit stream associated with the at least one video image is encoded according to at least one of the following formats: H.261, H.263, H.264, MPEG-1, MPEG-2, and MPEG-4.

3. The method of claim 1, wherein the macroblock header maps each macroblock to a respective portion of the video image.

4. The method of claim 1, wherein:
the at least one video image comprises a plurality of pixels; and
each macroblock is associated with a respective portion of the plurality of pixels.

5. The method of claim 1, wherein:
each macroblock in the received bit stream comprises chrominance data in a particular digital format;
the at least one macroblock header is encrypted while the chrominance data in the plurality of macroblocks remains in the particular digital format; and
transmitting the bit stream such that the at least one macroblock is in an unencrypted format comprises transmitting the plurality of macroblocks in the particular digital format.

6. The method of claim 1, wherein:
the second sequence is a pseudo-random sequence based at least in part on a scramble key; and
rearranging the plurality of macroblocks into the second sequence comprises ordering, using the processor, the plurality of macroblocks in the bit stream in accordance with the second sequence.

7. The method of claim 1, wherein:
the bit stream is transmitted over a network to a decrypter;
and further comprising:
decrypting the at least one macroblock header;
decompressing the bit stream associated with the at least one video image; and
displaying the at least one video image.

8. An apparatus, comprising:
a memory operable to store a cryptographic key; and
a processor communicatively coupled to the memory and operable to:
receive a bit stream associated with at least one video image, wherein the bit stream comprises at least one macroblock header and a plurality of macroblocks, the plurality of macroblocks arranged in a first sequence;
encrypt the at least one macroblock header based at least in part on the cryptographic key;
rearrange the plurality of macroblocks into a second sequence in the bit stream in conjunction with encrypting the at least one macroblock header; and
transmit the bit stream such that:
the at least one macroblock header is in an encrypted format; and
at least one macroblock is in an unencrypted format.

9. The apparatus of claim 8, wherein the bit stream associated with the at least one video image is encoded according to at least one of the following formats: H.261, H.263, H.264, MPEG-1, MPEG-2, and MPEG-4.

10. The apparatus of claim 8, wherein the macroblock header maps each macroblock to a respective portion of the video image.

11. The apparatus of claim 8, wherein:
the at least one video image comprises a plurality of pixels; and
each macroblock is associated with a respective portion of the plurality of pixels.

12. The apparatus of claim 8, wherein:
each macroblock in the received bit stream comprises chrominance data in a particular digital format;
the at least one macroblock header is encrypted while the chrominance data in the plurality of macroblocks remains in the particular digital format; and
transmitting the bit stream such that the at least one macroblock is in an unencrypted format comprises transmitting the plurality of macroblocks in the particular digital format.

13. The apparatus of claim 8, wherein:
the second sequence is a pseudo-random sequence based at least in part on a scramble key; and
rearranging the plurality of macroblocks into the second sequence comprises ordering the plurality of macroblocks in the bit stream in accordance with the second sequence.

14. The apparatus of claim 13, wherein the processor is further operable to:
encrypt the scramble key; and
in conjunction with transmitting the bit stream, transmit the encrypted scramble key.

15. A system, comprising:
a camera operable to capture at least one video image;
an encoder communicatively coupled to the camera, wherein:
the encoder is operable to compress the at least one video image into a bit stream; and
the bit stream comprises at least one macroblock header and a plurality of macroblocks, the plurality of macroblocks arranged in a first sequence;
and
an encrypter communicatively coupled to the encoder and operable to:
encrypt the at least one macroblock header;
rearrange the plurality of macroblocks into a second sequence in the bit stream in conjunction with encrypting the at least one macroblock header; and
transmit the bit stream such that:
the at least one macroblock header is in an encrypted format; and
at least one macroblock is in an unencrypted format.

16. The system of claim 15, wherein the macroblock header maps each macroblock to a respective portion of the video image.

17. The system of claim 15, wherein:
each macroblock in the received bit stream comprises chrominance data in a particular digital format;
the at least one macroblock header is encrypted while the chrominance data in the plurality of macroblocks remains in the particular digital format; and
transmitting the bit stream such that the at least one macroblock is in an unencrypted format comprises transmitting the plurality of macroblocks in the particular digital format.

18. The system of claim 15, wherein:
the bit stream is transmitted over a network to a decrypter that is operable to decrypt the at least one macroblock header;
and further comprising:
a decoder that is operable to decompress the bit stream, wherein decompressing the bit stream comprises mapping at least one macroblock to a portion of the at least one video image based at least in part on the decrypted macroblock header.

* * * * *